United States Patent
Zhang et al.

(10) Patent No.: US 11,428,274 B1
(45) Date of Patent: Aug. 30, 2022

(54) VEHICLE CLUTCH ASSEMBLY HAVING OIL DEFLECTOR

(71) Applicant: Ford Global Technologies, LLC, Dearborn, MI (US)

(72) Inventors: Dengfu Zhang, Northville, MI (US); John Edsel Robarge, Saline, MI (US); Chin-Yuan Perng, Ann Arbor, MI (US); Samantha Hart, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/323,522

(22) Filed: May 18, 2021

(51) Int. Cl.
  *F16D 13/74* (2006.01)
  *F16D 13/64* (2006.01)
  *F16H 57/04* (2010.01)
  *F16D 13/72* (2006.01)

(52) U.S. Cl.
  CPC ............ *F16D 13/74* (2013.01); *F16D 13/644* (2013.01); *F16H 57/0423* (2013.01); *F16H 57/0473* (2013.01); *F16D 13/72* (2013.01)

(58) Field of Classification Search
  CPC ........ F16D 13/74; F16D 13/644; F16D 13/72; F16H 57/0423; F16H 57/0473
  See application file for complete search history.

(56) References Cited

U.S. PATENT DOCUMENTS

| | | | |
|---|---|---|---|
| 3,366,210 | A | 1/1968 | Webster |
| 3,452,848 | A | 7/1969 | Brunner |
| 4,004,670 | A | 1/1977 | Nerstad et al. |
| 4,299,320 | A | 11/1981 | Delsman et al. |
| 4,413,716 | A * | 11/1983 | Newsome ............... F16D 13/72 192/70.12 |
| 4,446,953 | A | 5/1984 | Voss et al. |
| 4,458,793 | A | 7/1984 | Riese et al. |
| 10,138,950 | B2 * | 11/2018 | Ohno ..................... F16D 13/52 |
| 10,830,286 | B2 | 11/2020 | Zhang et al. |
| 2019/0154136 | A1 | 5/2019 | Zwerger et al. |
| 2020/0025264 | A1 * | 1/2020 | Zhang ................ F16D 25/0638 |

FOREIGN PATENT DOCUMENTS

EP  3194812  11/2018

* cited by examiner

*Primary Examiner* — Tinh Dang
(74) *Attorney, Agent, or Firm* — Burris Law, PLLC

(57) ABSTRACT

A clutch assembly includes a clutch housing, a clutch hub, a clutch pack and an oil deflector. The clutch pack includes at least one friction plate connected to one of the clutch housing and the clutch hub and at least one separator plate connected to the other of the clutch housing and the clutch hub. The oil deflector includes a circumferential wall and a flange. The circumferential wall includes a drain slot. The flange extends radially outwardly from an end of the circumferential wall and is mounted to one of the at least one separator plate and the at least one friction plate. The circumferential wall and the first flange cooperate to define a channel. Lubricant flowing along the clutch housing flows to the channel where the lubricant is directed away from the clutch pack and out of the drain slot.

20 Claims, 6 Drawing Sheets

VEHICLE CLUTCH ASSEMBLY HAVING OIL DEFLECTOR

FIELD

The present disclosure relates to a clutch assembly having an oil deflector and a vehicle including a clutch assembly having an oil deflector.

BACKGROUND

The statements in this section merely provide background information related to the present disclosure and may not constitute prior art.

Many vehicles are used over a wide range of vehicle speeds and include a powertrain system and a drivetrain system. The powertrain system includes, for example, an engine and a transmission. The transmission transmits rotary power generated by the engine to the drivetrain system to propel the vehicle forward or rearward. The transmission transmits rotary power from the engine using a variety of speed ratios. Many transmissions use friction clutches and brakes, which are engaged in different combinations to establish different power flow paths having different speeds ratios.

One type of commonly used friction clutch is a multi-plate clutch. The multi-plate clutch includes a set of friction plates splined to one component and interleaved with a set of separator plates splined to a different component. The multi-plate clutch may be movable in a first position in which the friction plates and the separator plates are pressed together such that the friction between the friction plates and the separator plates causes the transmission of torque between the two components, and a second position in which the friction plates and the separator plates are released from each other such that the two components are allowed to rotate at different speeds from one another. The multi-plate clutch may be supplied with lubricant to absorb heat from the friction plates and the separator plates, thereby cooling the multi-plate clutch. In these clutches, an amount of transmission drag loss due is experienced due to unwanted viscous drag from an open clutch, which negatively impacts fuel economy.

These drag loss issues related to friction clutches, among other issue related to transmission drag loss, are addressed by the present disclosure.

SUMMARY

This section provides a general summary of the disclosure and is not a comprehensive disclosure of its full scope or all of its features.

The present disclosure provides a clutch that directs excess lubricant away from the clutch and to an oil sump of the transmission.

In one form, the present disclosure provides an oil deflector for use in a clutch assembly having a clutch housing, a clutch hub, and a clutch pack. The clutch pack includes a friction plate connected to one of the clutch housing and the clutch hub and a separator plate connected to the other of the clutch housing and the clutch hub. The oil deflector includes a circumferential wall, a mounting flange, and a return flange. The mounting flange extends radially outwardly from a first end of the circumferential wall and is secured to the separator plate or the friction plate. The return flange extends radially outwardly from a second end of the circumferential wall and includes a drain slot. The circumferential wall, the mounting flange, and the return flange cooperate to define a flow channel.

In some configurations of the oil deflector of the above paragraph, the drain slot spans an angle between 60 degrees and 65 degrees along a circumference of the circumferential wall.

In some configurations of the oil deflector of any one or more of the above paragraphs, the circumferential wall is angled radially outward relative to a longitudinal axis of the oil deflector.

In some configurations of the oil deflector of any one or more of the above paragraphs, the circumferential wall is angled between 10 degrees and 15 degrees relative to the longitudinal axis of the oil deflector.

In some configurations of the oil deflector of any one or more of the above paragraphs, the circumferential wall, the mounting flange, and the return flange have a uniform thickness.

In some configurations of the oil deflector of any one or more of the above paragraphs, the uniform thickness is between 1.8-2.2 millimeters.

In some configurations of the oil deflector of any one or more of the above paragraphs, the return flange extends at an acute angle relative to the circumferential wall.

In some configurations of the oil deflector of any one or more of the above paragraphs, the mounting flange extends further radially outwardly than the return flange.

In some configurations of the oil deflector of any one or more of the above paragraphs, the return flange and the circumferential wall form an angle. The angle is between 60 degrees and 65 degrees.

In another form, the present disclosure provides an oil deflector for use in a clutch assembly having a clutch housing, a clutch hub, and a clutch pack. The clutch pack includes a friction plate connected to one of the clutch housing and the clutch hub and a separator plate connected to the other of the clutch housing and the clutch hub. The oil deflector includes a circumferential wall, a first flange, and a second flange. The first flange extends radially outwardly from a first end of the circumferential wall and is secured to the separator plate or the friction plate. The second flange extends radially outwardly from a second end of the circumferential wall and extends at an acute angle relative to the circumferential wall. The circumferential wall, the first flange, and the second flange defines a flow channel.

In some configurations of the oil deflector of the above paragraph, the circumferential wall, the first flange, and the second flange have a uniform thickness.

In some configurations of the oil deflector of any one or more of the above paragraphs, the uniform thickness is between 1.8-2.2 millimeters.

In some configurations of the oil deflector of any one or more of the above paragraphs, the drain slot extends through the circumferential wall.

In some configurations of the oil deflector of any one or more of the above paragraphs, a distance from a location where a line extending along an outer circumferential surface of the circumferential wall intersects with an outer surface of the second flange to a distal end of the second flange is between 5 millimeters and 8 millimeters.

In some configurations of the oil deflector of any one or more of the above paragraphs, the first flange extends further radially outwardly than the second flange.

In some configurations of the oil deflector of any one or more of the above paragraphs, the second flange includes a drain slot.

In some configurations of the oil deflector of any one or more of the above paragraphs, the drain slot spans an angle between 60 degrees and 65 degrees along a circumference of the circumferential wall.

In some configurations of the oil deflector of any one or more of the above paragraphs, the circumferential wall is angled radially outward relative to a longitudinal axis of the oil deflector.

In some configurations of the oil deflector of any one or more of the above paragraphs, the circumferential wall is angled between 10 degrees and 15 degrees relative to the longitudinal axis of the oil deflector.

In yet another form, the present disclosure provides a clutch assembly for a transmission having an oil sump. The clutch assembly includes a clutch housing, a clutch hub, a clutch pack, and an oil deflector. The clutch pack includes a friction plate connected to one of the clutch housing and the clutch hub and a separator plate connected to the other of the clutch housing and the clutch hub. The oil deflector includes a wall, a first flange, and a second flange. The first flange extends radially outwardly from a first end of the wall and is mounted to one of the friction plate and the separator plate. The second flange extends radially outwardly from a second end of the wall and includes a drain slot proximate the oil sump. The wall, the first flange, and the second flange define a flow channel.

In some configurations of the clutch assembly of the above paragraph, the oil deflector has an annular-shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
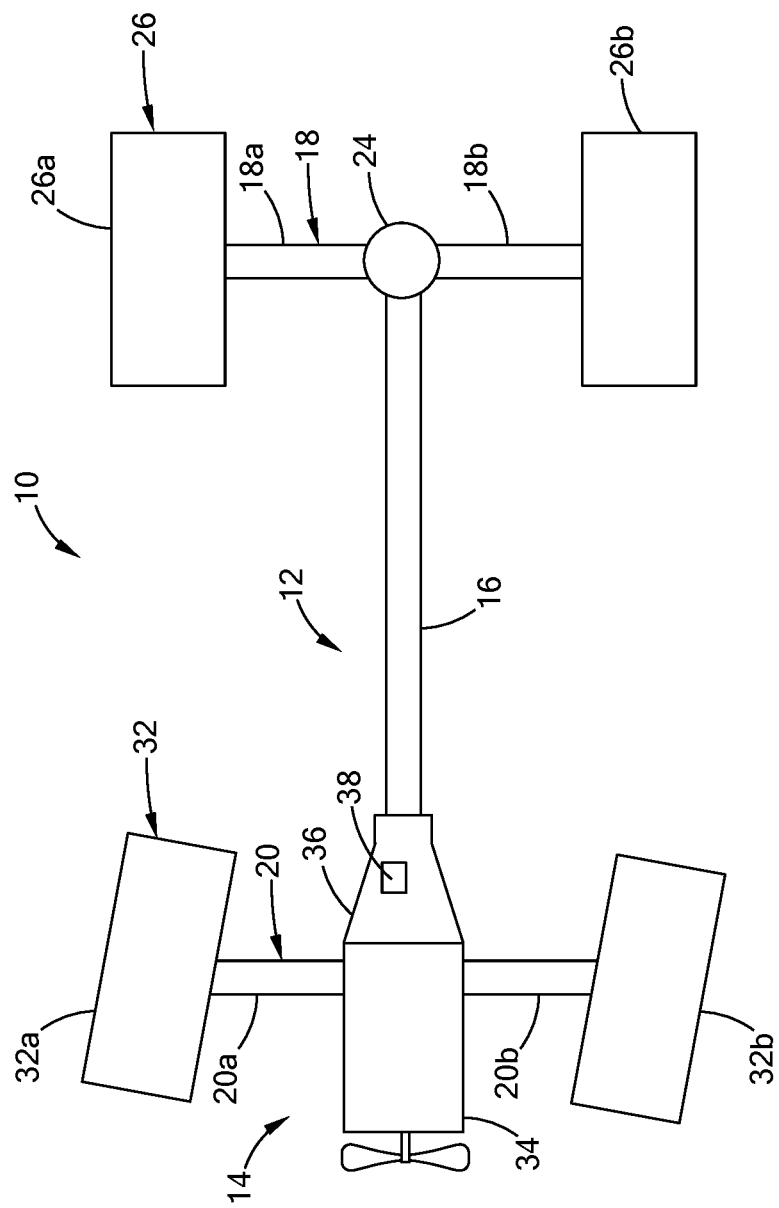
FIG. 1 is a schematic view of a vehicle including a transmission having a clutch assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotatory power generated by the powertrain system 14 is transmitted to the primary axle 18 via the propeller shaft 16 to drive a set of rear wheels 26. The primary axle 18 includes a first shaft 18a and a second shaft 18b. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36. The engine 34 generates rotary power and may be an internal combustion engine, for example. The transmission 36 transmits rotary power from the engine 34 to the drivetrain system 12.

Figure 2:
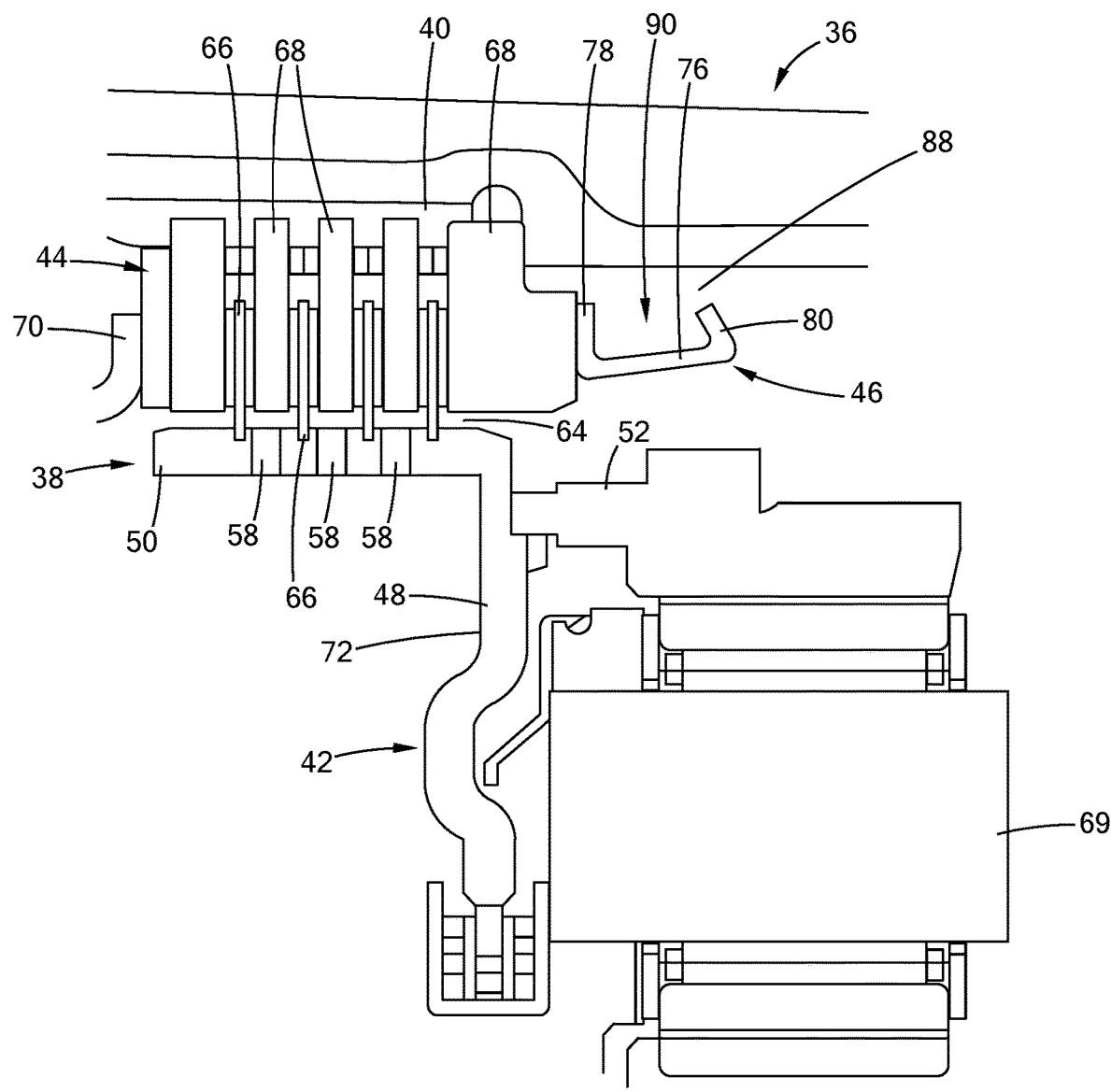
FIG. 2 is a cross-sectional view of a portion of the clutch assembly of the transmission of the vehicle of FIG. 1.
Figure 3:
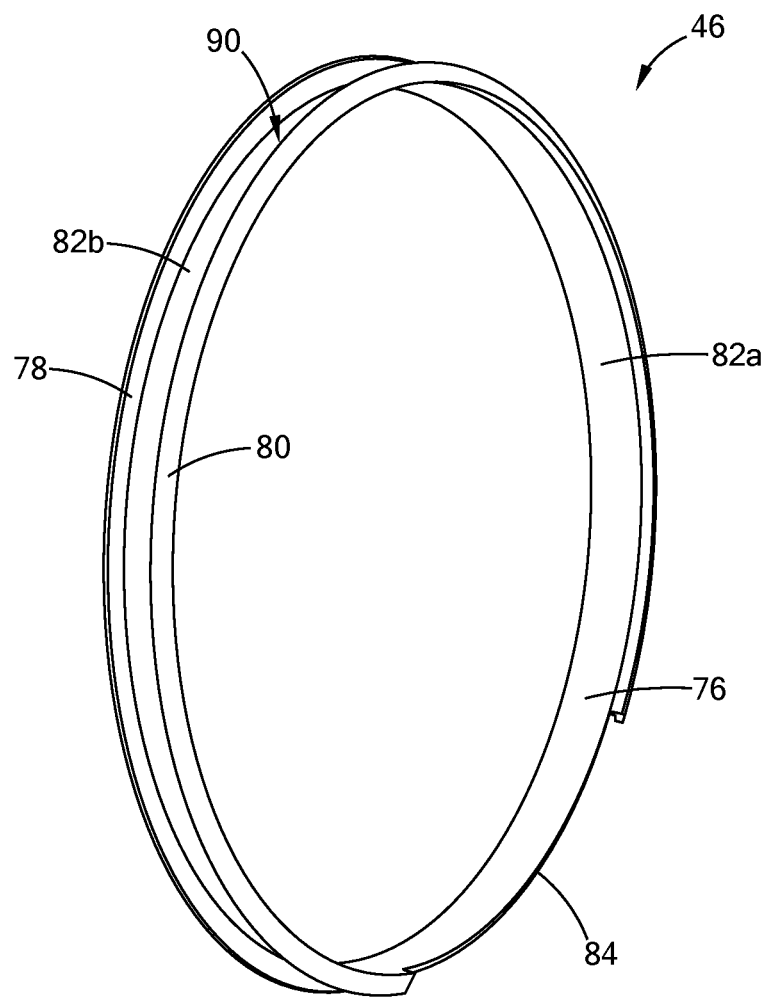
FIG. 3 is a perspective view of an oil deflector of the clutch assembly of FIG. 2.

With reference to FIG. 2, the transmission 36 includes, inter alia, a transmission casing (not shown) and a clutch assembly 38. The clutch assembly 38 selectively couples first and second rotating elements (not shown) to one another and includes a clutch housing 40, a clutch hub 42, a clutch pack 44, and an annular oil deflector 46. The clutch housing 40 is fixed to one of the first and second rotating elements and rotates about a central shaft (not shown).

The clutch hub 42 is fixed to the other of the first and second rotating elements and rotates about the central shaft. The clutch hub 42 includes a disk 48, an annular rim 50, and a hub portion 52. The disk 48 extends in a radial direction. The rim 50 extends from an end of the disk 48 in a first axial direction (i.e., the first axial direction is parallel to an axis of the central shaft (not shown) of the transmission 36 and perpendicular to the disk 48) and includes a plurality of apertures 58 extending therethrough. The apertures 58 extend in a radial direction from an inner circumferential surface of the rim 50 to an outer circumferential surface. The hub portion 52 extends from the disk 48 in a second axial direction (i.e., the second axial direction is parallel to the axis of the central shaft (not shown) of the transmission 36 and perpendicular to the disk 48) that is opposite the first axial direction and may at least partially house a gearset 69 (e.g., a planetary gearset).

The clutch pack 44 cooperates with the rim 50 to define an axial passage 64. The clutch pack 44 includes a plurality of friction plates 66 and a plurality of separator plates 68. The friction plates 66 are splined to the rim 50 of the clutch hub 42 and interleaved with the separator plates 68 that are splined to the clutch housing 40. The leftmost separator plate 68 is constrained axially by a retaining element 70 (e.g., a snap ring). The clutch pack 44 may be operable in a first mode and a second mode. In the first mode, the friction plates 66 and the separator plates 68 are pressed together (the friction plates 66 and the separator plates 68 are engaged with each other) such that the friction between the friction plates 66 and the separator plates 68 causes the transmission of torque between the clutch housing 40 and the clutch hub 42. In this way, the clutch housing 40 and the clutch hub 42 rotate together as a single unit. In the second mode, the friction plates 66 and the separator plates 68 are released from each other (i.e., the friction plates 66 and the separator plates 68 are disengaged from each other) such that the clutch housing 40 and the clutch hub 42 are allowed to rotate at different speeds from one another.

A portion of lubricant (e.g., oil) contained in the transmission casing (not shown) may flow along a surface 72 of the disk 48 due to centrifugal forces where it may exit the apertures 58 of the rim 50 and flow past an area between the friction plates 66 and the separator plates 68. As the portion of lubricant flows past the area between the friction plates 66 and the separator plates 68, the portion of lubricant may absorb heat from the friction plates 66 and/or the separator plates 68, thereby cooling the friction plates 66 and the separator plates 68. The portion of the lubricant may then flow out of apertures (not shown) in the clutch housing 40 and to a lubricant sump (not shown) of the transmission casing (not shown).

With reference to FIGS. 2-6, the oil deflector 46 directs lubricant flowing along the clutch housing 40 and from other components within the transmission, for example, away from the clutch pack 44 and to the oil sump (not shown) of the transmission casing (not shown). For example, a portion of lubricant lubricating internal components of the transmission 36 (e.g., the gearset 69 housed within the hub portion 52 of the clutch hub 42) may be directed radially outwardly toward the clutch housing 40 due to centrifugal forces where it may flow along the clutch housing 40 and toward the clutch pack 44. The oil deflector 46 associated with the clutch pack 44 directs the portion of lubricant away from the clutch pack 44 and toward the oil sump of the transmission casing, thereby inhibiting lubricant accumulation at the clutch pack 44.

Figure 4:
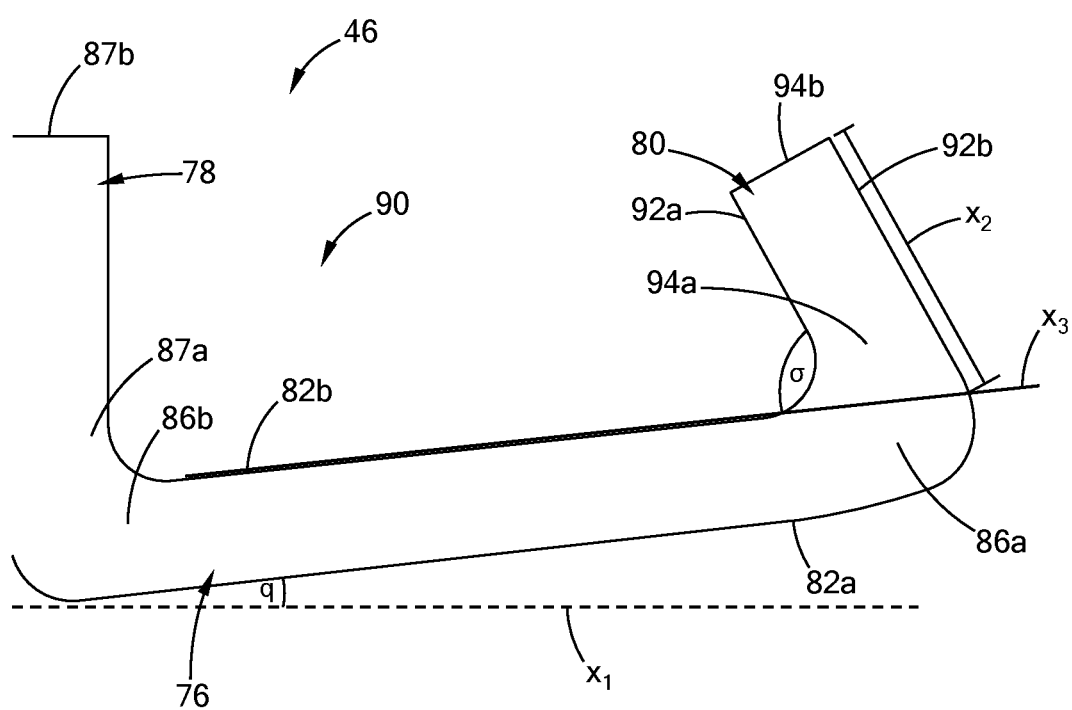
FIG. 4 is an enlarged cross-sectional view of a portion of the oil deflector of the clutch assembly of FIG. 2.
Figure 5:
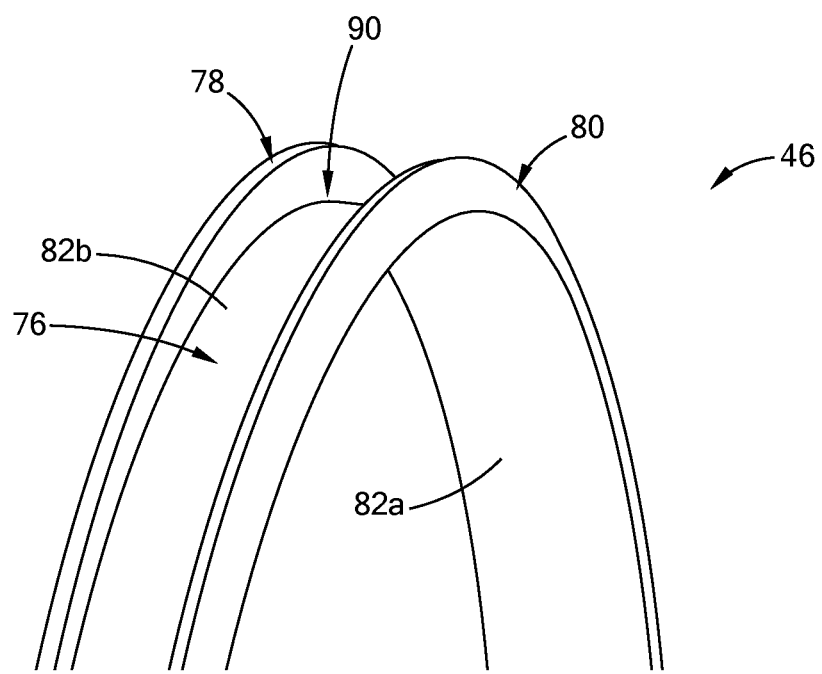
FIG. 5 is a perspective view of a portion of the oil deflector of the clutch assembly of FIG. 2.
Figure 6:
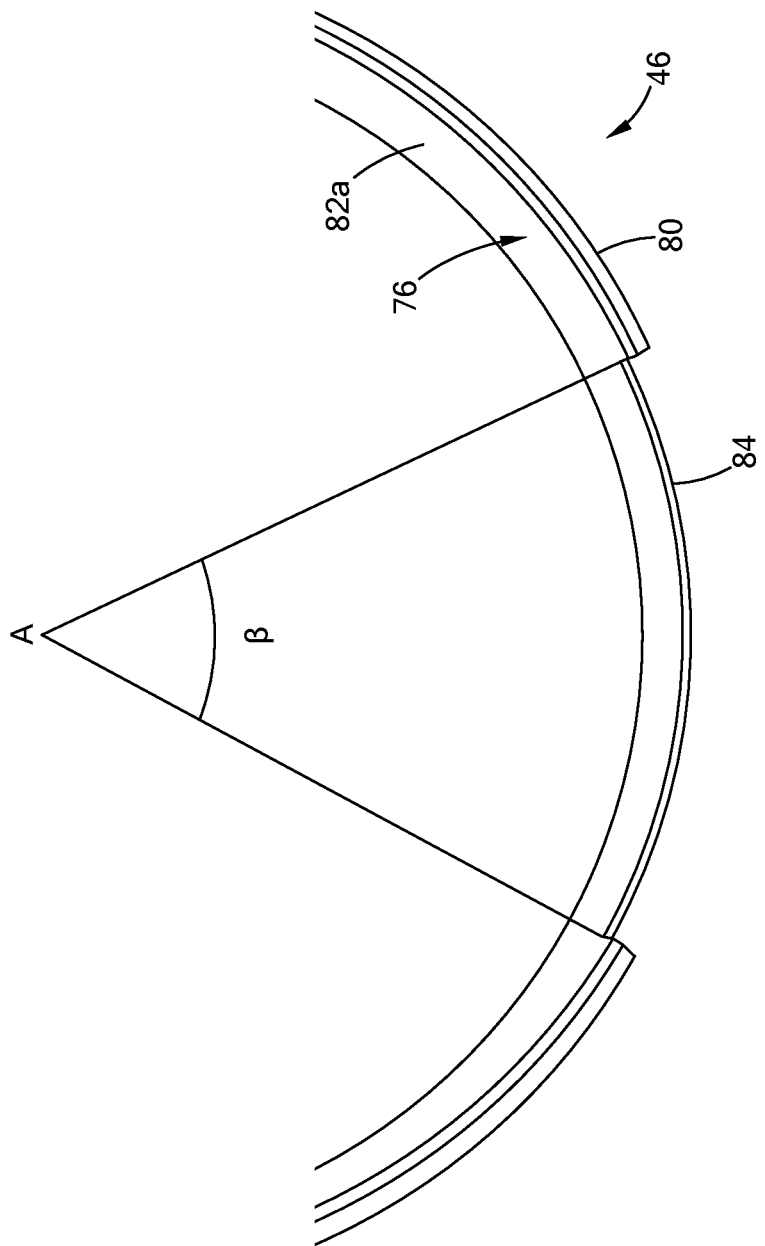
FIG. 6 is a front end view of a portion of the oil deflector of the clutch assembly of FIG. 2.

The oil deflector 46 is made of a plastic material and has a cross-section that is U-shaped (FIG. 4). In some configurations, the oil deflector 46 may be made of a metal material (e.g., aluminum). The oil deflector 46 is coupled to the rightmost plate of the clutch pack 44 via fasteners (not shown, screws, bolts, etc.). In some configurations, the oil deflector 46 is coupled to the rightmost plate of the clutch pack 44 via adhesives, welding, or any other suitable attachment means. As shown in FIG. 2, the rightmost plate is the separator plate 68. In some configurations, the rightmost plate may be a friction plate 66.

With reference to FIGS. 2-6, the oil deflector 46 includes a circumferential wall 76, a first or mounting flange 78, and a second or return flange 80. The oil deflector 46 also has a uniform thickness (i.e., the thickness of the circumferential wall 76, the first flange 78, and the second flange 80 are equal). The thickness may be between 1.8-2.2 millimeters (mm). As shown in FIG. 4, the circumferential wall 76 is angled radially outward relative to a longitudinal axis X1 of the oil deflector 46, and has an inner circumferential surface 82a and an outer circumferential surface 82b. The inner circumferential surface 82a and the longitudinal axis X1 of the oil deflector 46 form an angle $\theta$. The angle $\theta$ is between 10 degrees and 15 degrees.

The first flange 78 extends radially outwardly from a second end 86b of the circumferential wall 76 that is opposite the first end 86a and is mounted to the rightmost plate of the clutch pack 44 via fasteners (i.e., the first flange 78 is mounted to the separator plate 68). The first flange 78 also extends 360 degrees around the second end 86b of the circumferential wall 76 and has a proximal end 87a (i.e., proximal to the second end 86b of the circumferential wall 76) and a distal end 87b (i.e., distal to the second end 86b of the circumferential wall 76).

The second flange 80 extends radially outwardly from the first end 86a of the circumferential wall 76 and cooperates with the clutch housing 40 to define an inlet 88 (FIG. 2). The second flange 80 includes a drain slot 84 (FIGS. 3 and 6) proximate the oil sump (not shown) of the transmission casing (not shown). The drain slot 84 spans an angle $\beta$ between 60 degrees and 65 degrees along a circumference of the circumferential wall 76 about point A. The first flange 78 extends further radially outwardly than the second flange 80. The circumferential wall 76, the first flange 78, and the second flange 80 cooperate to define a channel 90. The portion of lubricant flowing along the clutch housing 40 as described above flows to the channel 90 via the inlet 88 where it is directed away from the clutch pack 44 and the axial passage 64 and out of the drain slot 84 to the oil sump (not shown).

The second flange 80 has an inside surface 92a (i.e., the inside surface 92a faces toward the channel 90) and an outside surface 92b (i.e., the outside surface 92b faces away from the channel 90). As shown in FIG. 4, the second flange 80 also extends at an acute angle $\sigma$ relative to the circumferential wall 76 (i.e., the inside surface 92a of the second flange 80 and the outer circumferential surface 82b of the circumferential wall 76 form the acute angle $\sigma$). The angle $\sigma$ is between 60 degrees and 65 degrees.

The second flange 80 also has a proximal end 94a (i.e., proximal to the first end 86a of the circumferential wall 76) and a distal end 94b (i.e., distal to the first end 86a of the circumferential wall 76). A distance X2 from a location where a line X3 extending along the outer circumferential surface 82b intersects with the outside surface 92b of the second flange 80 to the distal end 94b of the second flange 80 is between 5 millimeters (mm) and 8 millimeters (mm).

The oil deflector 46 of the present disclosure provides the benefit of directing lubricant lubricating other internal components of the transmission 36 (e.g., a gearset) away from the clutch pack 44, thereby inhibiting lubricant accumulation at the clutch pack 44. This, in turn, improves fuel efficiency of the vehicle 10, for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A clutch assembly comprising:
a clutch housing:
a clutch hub;
a clutch pack including at least one friction plate connected to one of the clutch housing and the clutch hub and at least one separator plate connected to the other of the clutch housing and the clutch hub; and
an oil deflector including a circumferential wall and a first flange, the circumferential wall including a drain slot, the first flange extending radially outwardly from a first end of the circumferential wall and mounted to one of the at least one separator plate and the at least one friction plate, the circumferential wall and the first flange cooperating to define a channel, wherein lubricant flowing along the clutch housing flows to the channel where the lubricant is directed away from the clutch pack and out of the drain slot.

2. The clutch assembly according to claim 1, wherein the drain slot spans an angle between 60 degrees and 65 degrees about point A.

3. The clutch assembly according to claim 1, wherein the oil deflector has a horn-shaped cross-section.

4. The clutch assembly according to claim 1, wherein an inner circumferential surface of the circumferential wall and a line extending parallel to a center axis of the oil deflector form an angle.

5. The clutch assembly according to claim 4, wherein the angle is between 10 degrees and 15 degrees.

6. The clutch assembly according to claim 1, wherein the oil deflector has a uniform thickness.

7. The clutch assembly according to claim 6, wherein the uniform thickness is between 1.8-2.2 millimeters.

8. The clutch assembly according to claim 1, wherein the oil deflector includes a second flange extending radially outwardly from a second end of the circumferential wall, and wherein the first flange extends further radially outwardly than the second flange.

9. The clutch assembly according to claim 8, wherein an inside surface of the second flange and an outer circumferential surface of the circumferential wall form an angle, the angle is between 60 degrees and 65 degrees.

10. A clutch assembly comprising:
a clutch housing:
a clutch hub;
a clutch pack cooperating with the clutch hub to define an axial passage, the clutch pack including at least one friction plate connected to one of the clutch housing and the clutch hub and at least one separator plate connected to the other of the clutch housing and the clutch hub; and
an oil deflector including a circumferential wall, a first flange and a second flange, the circumferential wall including a drain slot, the first flange extending radially outwardly from a first end of the circumferential wall and mounted to one of the at least one separator plate and the at least one friction plate, the second flange extending radially outwardly from a second end of the circumferential wall, the circumferential wall, the first flange, and the second flange defining a channel,
wherein lubricant flowing along the clutch housing flows to the channel where the lubricant is directed away from the axial passage and out of the drain slot.

11. The clutch assembly according to claim 10, wherein an inside surface of the second flange and an outer circumferential surface of the circumferential wall form an angle, the angle is between 60 degrees and 65 degrees.

12. The clutch assembly according to claim 10, wherein the drain slot extends through the circumferential wall.

13. The clutch assembly according to claim 10, wherein a distance from a location where a line extending along an outer circumferential surface of the circumferential wall intersects with an outer surface of the second flange to a distal end of the second flange is between 5 millimeters and 8 millimeters.

14. The clutch assembly according to claim 10, wherein the first flange extends further radially outwardly than the second flange.

15. The clutch assembly according to claim 10, wherein the drain slot is located proximate the second end of the circumferential wall.

16. The clutch assembly according to claim 10, wherein the second flange extends substantially around the second end of the circumferential wall.

17. The clutch assembly according to claim 10, wherein the clutch housing and the second flange form an inlet, and wherein lubricant flowing around the clutch hub flows to the channel via the inlet.

18. The clutch assembly according to claim 10, wherein the drain slot spans an angle between 60 degrees and 65 degrees about point A.

19. The clutch assembly according to claim 10, wherein an inner circumferential surface of the circumferential wall and a line extending parallel to a center axis of the oil deflector form an angle, and wherein the angle is between 10 degrees and 15 degrees.

20. A clutch assembly for a transmission having an oil sump, the clutch assembly comprising:
a clutch housing:
a clutch hub including a rim defining a plurality of apertures;
a clutch pack cooperating with the rim of the clutch hub to define an axial passage, the clutch pack including a friction plate connected to one of the clutch housing and the clutch hub and a separator plate connected to the other of the clutch housing and the clutch hub; and
an oil deflector including a circumferential wall, a first flange, and a second flange, the circumferential wall including a drain slot configured to be proximate the oil sump, the first flange extending radially outwardly from a first end of the circumferential wall and mounted to one of the friction plate and the separator plate, the second flange extending radially outwardly from a second end of the circumferential wall and cooperating with the clutch housing to define an inlet, the circumferential wall, the first flange, and the second flange defining a channel,
wherein a first portion of lubricant flowing along the clutch hub is allowed to flow through the plurality of apertures to lubricate the clutch pack, and wherein a second portion of lubricant flowing along the clutch housing flows to the channel via the inlet where the second portion of lubricant is directed away from the axial passage and out of the drain slot.

\* \* \* \* \*